US005519830A

United States Patent [19]
Opoczynski

[11] Patent Number: 5,519,830
[45] Date of Patent: May 21, 1996

[54] POINT-TO-MULTIPOINT PERFORMANCE MONITORING AND FAILURE ISOLATION SYSTEM

[75] Inventor: Adam Opoczynski, Eden Prairie, Minn.

[73] Assignee: ADC Telecommunications, Inc., Minneapolis, Minn.

[21] Appl. No.: 74,913

[22] Filed: Jun. 10, 1993

[51] Int. Cl.[6] .................................................. G06F 11/00
[52] U.S. Cl. ............................ 395/182.02; 395/184.01; 395/185.05
[58] Field of Search ............................... 371/20.1, 11.2, 371/4, 5.1, 16.5, 6; 395/575, 5.2, 6, 182.02, 184.01, 185.05, 185.01

[56] References Cited

U.S. PATENT DOCUMENTS

| Re. 33,900 | 4/1992 | Howson . |
| 3,787,613 | 1/1974 | Famer et al. . |

(List continued on next page.)

FOREIGN PATENT DOCUMENTS

| 1204230 | 5/1986 | Canada . |
| 2002295 | 5/1990 | Canada . |
| 2008900 | 10/1990 | Canada . |
| 2051252 | 3/1992 | Canada . |
| 0118763 | 9/1984 | European Pat. Off. . |
| 0168051 | 7/1985 | European Pat. Off. . |
| 0287379A1 | 10/1988 | European Pat. Off. . |

(List continued on next page.)

OTHER PUBLICATIONS

Grover et al "Design and Characterization of an Error Correcting Code for the Sonet STS-1 Tributary" IEEE Trans. on Communications vol. 38, No. 4, Apr. 1990 pp. 467–476.
Ramaswami et al "Analysis of the Link Error Monitoring Algorithms in the Signaling System No. 7 Protocol" Infocom 1993 IEEE pp. 859–866.
Lightwave Systems in Subscriber Loop. Single–mode fibers and coherent transmission have become the focal point of research in subscriber–access systems. M. Gawdun.
Economic FO System for New Residential Services. Neale C. Hightower. Telephony Mar. 17, 1986.
Economic ASnalyssi of Telecommunication Loop Architectures. Linda F. Garbanati, Member of Technical Staff, Bell Communications Research.
Das BIGFON–Systemkonzept ASnforderungen and Aufgabenstellung. Wolfgang Schmidt. Nachrichtentechnische Berichte. Heft 1 Mai 1984.

(List continued on next page.)

Primary Examiner—Robert W. Beausoliel, Jr.
Assistant Examiner—Joseph E. Palys
Attorney, Agent, or Firm—Schwegman, Lundberg, Woessner & Kluth

[57] ABSTRACT

A system monitors the performance of a communications network and isolates the location of equipment failures therein through analysis of performance error data. The system passively monitors the performance of the network, operating in the background during normal data and/or voice transmission. The head end generates and inserts multiple error codes, one for each remote unit, into the downstream traffic path. Each remote unit extracts and decodes its respective error code to determine whether a downstream error occurred. Each remote unit then calculates a new error code based on the result of the downstream decode and the respective upstream data message. The head end receives the upstream error codes from all the remote units, decodes them, and accumulates the error data from all remote units over a period of time. An error distribution is generated, and an analysis is performed thereon to isolate the location of error causing equipment failures. The information thus obtained can then be used to initiate facility and equipment protection and/or appropriate maintenance procedures. The invention results in an increased quality of transmission with minimal network down time and minimal impact on overall system performance.

23 Claims, 7 Drawing Sheets

U.S. PATENT DOCUMENTS

| | | | |
|---|---|---|---|
| 3,934,224 | 1/1976 | Dulaney et al. | 340/146.1 BA |
| 4,245,340 | 1/1981 | Landry . | |
| 4,253,729 | 3/1981 | Rocton . | |
| 4,282,400 | 8/1981 | Ribera et al. | 370/93 |
| 4,316,284 | 2/1982 | Howson . | |
| 4,316,285 | 2/1982 | Bobilin et al. . | |
| 4,395,780 | 7/1983 | Gohm et al. . | |
| 4,397,020 | 8/1983 | Howson . | |
| 4,441,180 | 4/1984 | Schussler . | |
| 4,484,218 | 11/1984 | Boland et al. . | |
| 4,491,983 | 1/1985 | Pinnow et al. . | |
| 4,500,989 | 2/1985 | Dahod | 370/85 |
| 4,506,387 | 3/1985 | Walter . | |
| 4,545,048 | 10/1985 | Hauk et al. . | |
| 4,574,305 | 3/1986 | Campbell et al. . | |
| 4,642,806 | 2/1987 | Hewitt et al. . | |
| 4,651,330 | 3/1987 | Ballance . | |
| 4,686,667 | 8/1987 | Ohnsorge . | |
| 4,705,350 | 11/1987 | Cheng . | |
| 4,709,418 | 11/1987 | Fox et al. . | |
| 4,710,924 | 12/1987 | Chum | 371/4 |
| 4,734,764 | 3/1988 | Pocock et al. . | |
| 4,745,592 | 5/1988 | Gabriagues . | |
| 4,748,689 | 5/1988 | Mohr . | |
| 4,769,761 | 9/1988 | Downes et al. | 371/4 |
| 4,775,210 | 10/1988 | Fioretti . | |
| 4,835,763 | 5/1989 | Lau | 370/16 |
| 4,886,336 | 12/1989 | Deusser et al. . | |
| 4,891,694 | 1/1990 | Way . | |
| 4,975,899 | 12/1990 | Faulkner . | |
| 4,975,916 | 12/1990 | Miracle et al. | 371/47.1 |
| 4,977,593 | 12/1990 | Ballance . | |
| 5,002,356 | 3/1991 | Koht et al. . | |
| 5,010,586 | 4/1991 | Mortimore et al. . | |
| 5,016,969 | 5/1991 | Saiia et al. . | |
| 5,054,050 | 10/1991 | Burke et al. . | |
| 5,063,595 | 11/1991 | Ballance . | |
| 5,067,173 | 11/1991 | Gordon et al. . | |
| 5,086,470 | 2/1992 | Ballance . | |
| 5,095,482 | 3/1992 | Grallert | 371/3 |
| 5,097,530 | 3/1992 | Holt et al. . | |
| 5,101,290 | 3/1992 | Eng et al. . | |
| 5,107,489 | 4/1992 | Brown et al. | 370/58.2 |
| 5,111,497 | 5/1992 | Bliven et al. . | |
| 5,136,411 | 8/1992 | Paik et al. . | |
| 5,142,532 | 8/1992 | Adams . | |
| 5,157,667 | 10/1992 | Carusone, Jr. et al. | 371/16.5 |
| 5,173,899 | 12/1992 | Ballance . | |
| 5,299,201 | 3/1994 | Carusone, Jr. et al. | 371/20.1 |
| 5,331,642 | 7/1994 | Valley et al. | 371/5.1 |
| 5,357,517 | 10/1994 | Takebe | 371/5.1 |

FOREIGN PATENT DOCUMENTS

| | | |
|---|---|---|
| 0308150A1 | 3/1989 | European Pat. Off. . |
| 0318335A1 | 5/1989 | European Pat. Off. . |
| 0318333A1 | 5/1989 | European Pat. Off. . |
| 0318332A1 | 5/1989 | European Pat. Off. . |
| 0318331A1 | 5/1989 | European Pat. Off. . |
| 0337619A1 | 10/1989 | European Pat. Off. . |
| 0382431A1 | 8/1990 | European Pat. Off. . |
| 3719283 | 12/1988 | Germany . |
| 2172165 | 9/1986 | United Kingdom . |
| 2254984 | 10/1992 | United Kingdom . |
| 88/05233 | 7/1988 | WIPO . |
| 88/05232 | 7/1988 | WIPO . |
| 88/09093 | 11/1988 | WIPO . |
| 89/05070 | 6/1989 | WIPO . |
| 89/05077 | 6/1989 | WIPO . |
| 89/05069 | 6/1989 | WIPO . |
| 89/09518 | 10/1989 | WIPO . |
| 90/14734 | 11/1990 | WIPO . |
| 90/14733 | 11/1990 | WIPO . |
| 91/02276 | 2/1991 | WIPO . |
| 91/04617 | 4/1991 | WIPO . |
| 91/06157 | 5/1991 | WIPO . |
| 91/09478 | 6/1991 | WIPO . |
| 91/08623 | 6/1991 | WIPO . |
| 91/11867 | 8/1991 | WIPO . |
| 92/07431 | 4/1992 | WIPO . |
| 92/07432 | 4/1992 | WIPO . |
| 92/10036 | 6/1992 | WIPO . |
| WO93/00760 | 1/1993 | WIPO . |

OTHER PUBLICATIONS

Fiber Optics Seminar. Jan. 18–20, 1988. SCTE—Society of Cable Television Engineers.

AM Transmission to Fiber. Communications Engineering and Design Apr. 1988.

Fiber Optics–Technology and Applications. Library of Congress Cataloging in Publication Data.

Broadband Networks. Chapter 11. pp. 216–223.

The Broward Cable Area Network Fiber Model. Robert A. Luff, Group VP Technology, Jones Intercable Communications Engineering and Design Feb. 1989.

The Institute of Electrical and Electronics Engineers Inc. UK & RI Section SP/COM Chapter. Programme and Abstracts for IEEE Workshop on Passive Optical Networks for the Local Loop. Heathrow Penta Hotel, London 8th–9th May 1990. Sponsors IEEE UK & RI Section and Optical Communications Committee of IEEE Communications Society in association with IEE.

BOC Week. Executive briefings on the Bell operating companies/regional holding companies. vol. 7, No. 15. Apr. 16, 1990.

Passive Optical Networks: The Low Cost Road to the Future. Keither Oakley. British Telecom, London, UK. Broadband '89 313–318.

Advanced Optical Technologies for the future Local Network. A. M. Hill, J. R. Stern. British Telecom Research Laboratories, Ipswich, UK. E–FOC 89. 111–115.

Digital CATV via Passive Optical Networks. D. W. Faulkner, D. M. Russ, British Telecom, Research Laboratories, Martiesham Heath, Ipswich, UK. EFOC/LAN 88. 127–130.

Broadband Passive Optical Network Evolution. D. W. Faulkner. British Telecom Research Laboratories Ipswich, Suffolk, UK. Broadband '89. 202–204.

Passive Optical Networks for the Subscriber Loop. Howard L. Lemberg. Bellcore.

Low–cost Digital Passive Optical Networks. A. R. J. Cook, D. W. Faulkner, P. J. Smith, R. A. Lobbett. British Telecom Research Laboratories, Martlesham Heath, U.K.

Big business drives U.K. local fiber. John Williamson, International Editor. Telephony/Aug. 28, 1989.

British Fiber loop trial to delivery telephone service. Public Networks. Lightwave Jun. 1989.

Special Report: Operational Support Systems. OSS: A Must for Fiber to the Curb. To become a deployable volume product, any FTTC system needs to be automated via an operational support system. Jul. 15, 1990/TE&M.

Plans for the Bishops Stortford (UK) Fibre to the Home Trials. Lawrence Bickers, Tom Rowbotham & Cliff Hoppitt. British Telecom Research Laboratories. 203.1.1.–203.1.5.

Star–structured optical local networks. J. R. Fox and E. J. Boswell. Fulcrum.

Broadband systems on passive optical networks. D. W. Faulkner and D. I. Fordham. Fulcrum.

Optically coupled remote multiplexers. M. G. Foxton and G. A. Pilling. Fulcrum.

Design of passive optical networks. M. H. Reeve, S. Hornung, L. Bickers, P. Jenkins and S. Mallinson. Fulcrum.

The Satnet Monitoring System. BBN Laboratories Incorporated.

IBM Technical Disclosure Bulletin, vol. 32, No. 4B, Sep. 1989, New York, US, pp. 201–203, "Data Switch Error Isolation and Reporting".

POINT-TO-MULTIPOINT PERFORMANCE MONITORING AND FAILURE ISOLATION SYSTEM

FIELD OF THE INVENTION

This invention relates generally to the field of communications systems, and more particularly to a system for monitoring the performance of a passive distribution network connected in a point-to-multipoint configuration and for isolating the location of equipment failures therein.

BACKGROUND OF THE INVENTION

Deployment of passive distribution systems, such as optical fiber, in the local telecommunications loop has opened opportunities for new types of services. Most of the new services target data transmission instead of voice. The major difference in the network requirements for digital data transmission versus voice transmission is in the quality of the transmission. The demand for high quality transmission and low outage time is forcing the new generation of systems to protect equipment as well as the passive distribution facilities.

The term "performance monitoring" is related to the quality of transmission over a network. One measure of a network's performance or transmission quality is the bit error rate (BER). Because of imperfections in the network and environmental conditions some data errors inevitably occur. However, equipment failures such as breakages, power loss, etc., can also cause data transmission errors to be introduced. BER is a measure of the number of errors which occur in a certain number of bits of transmission. For example, in a typical network the maximum acceptable BER is $10^{-10}$. This value means that one transmission error is allowed every $10^{10}$ bits. If the BER is greater than $10^{-10}$ the quality of transmission is not acceptable.

In order to determine the BER means must be provided to detect errors that occur. Another desirable feature is a mechanism to pinpoint the locations of the equipment failure which caused the errors so that equipment and protection facility switching can be achieved, or appropriate maintenance procedures performed.

A point-to-multipoint passive distribution network configuration consists of a head end connected to a single data path which splits into multiple branches, each branch associated with a unique remote unit. Communication between the head end and the multiple remote units is multiplexed on a passive distribution network (PDN) and each remote unit is programmed to extract and send data in a unique time slot. This means that all remote units share the single, or "feeder" section of the network, and that each have a dedicated branch, or "distribution" section of the network associated with it. One exemplary passive optical system is described in U.S. Pat. No. 4,977,593, to Ballance, issued Dec. 11, 1990 and assigned to British Telecommunications, which is incorporated herein by reference.

Performance monitoring of such a configuration represents a major challenge because the indication of an error in the error code does not itself identify the particular equipment which is causing the errors. Because the multiple remote units share the feeder section of the PDN, in existing systems it is not possible to identify whether an error was introduced in the shared feeder, in a dedicated distribution branch or in one of the remote units themselves.

Typically, the location of an equipment failure is determined by downing all or part of the system and performing interactive diagnostic tests between the head end and the multiple remote units. This method, however, results in an undesirable and severe degradation in performance of the system as a whole. There is therefore a need in the art for a means of monitoring the performance of a PDN connected in a point-to-multipoint configuration, which can isolate the location of equipment failures with minimal impact on overall system performance.

SUMMARY OF THE INVENTION

To achieve the goals described above, the present invention provides a system which monitors the performance and isolates the location of equipment failures in a PDN network arranged in a point-to-multipoint configuration. The system passively monitors the performance of the network, operating in the background during normal data and/or voice transmission. The system unintrusively monitors the system for errors and isolates whether an equipment failure responsible for generating the errors is located in the shared feeder section of the PDN, in one of the dedicated distribution sections of the PDN or in one of the remote units themselves.

To isolate the location of equipment failures in the network, the present invention recognizes that different equipment failures in a point-to-multipoint configuration result in unique error distributions as seen across all remote units over time. The invention uses these error distributions to isolate the location of error causing equipment failures in the network.

To generate the error distributions, the head end generates and inserts multiple downstream error codes, one for each remote unit, into the downstream traffic path. The remote units extract and decode their respective error code to determine whether a downstream error occurred. Each remote unit then sets an internal error flag indicating the result of the downstream decode result. Upstream error codes are generated by each remote unit from the respective upstream data message. The upstream error codes are then set to indicate an error if a downstream error was received. The head end receives the upstream error codes from all the remote units, decodes them, and accumulates the error data from all remote units over a predetermined period of time. An error distribution representing the distribution of errors occurring across the entire system is generated from the accumulated error data. The error distribution is analyzed via software data processing methods to identify the type of error distribution occurring and to isolate therefrom the location of equipment failures which introduce the errors into the system. The location is isolated to either the shared feeder section of the PDN, to one of the distribution sections of the PDN or to one of the remote units. The information thus obtained can then be used to initiate facility and equipment protection and/or maintenance procedures. The system therefore results in an increased quality of transmission with minimal system down time and minimal impact on overall system performance.

BRIEF DESCRIPTION OF THE DRAWINGS

In the drawings, where like numerals refer to like elements throughout the several views.

DETAILED DESCRIPTION OF THE PREFERRED EMBODIMENT

In the following detailed description of the preferred embodiment, reference is made to the accompanying drawings which form a part hereof, and in which is shown by way of illustration a specific embodiment in which the invention may be practiced. This embodiment is described in sufficient detail to enable one skilled in the art to make and use the invention. It will be understood that other embodiments may be utilized and that structural changes may be made without departing from the spirit and scope of the present invention. The following detailed description is therefore not to be taken in a limiting sense, and the scope of the invention is to be defined by the appended claims.

Figure 1:
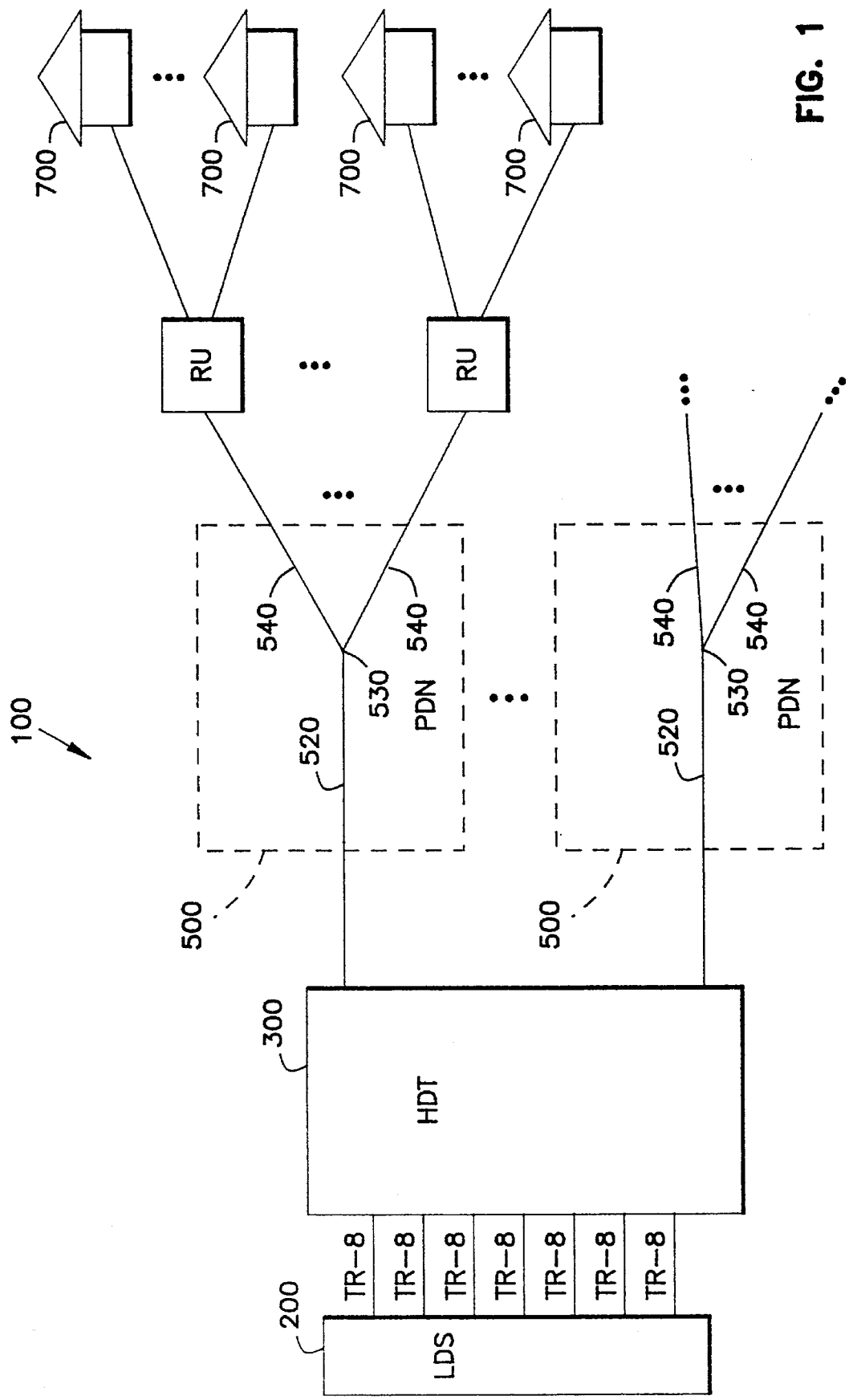
FIG. 1 shows a representative telecommunications system in block diagram form.

A general description of a telecommunications system will now be given. FIG. 1 shows a representative telecommunications system 100 in block diagram form. It shall be understood that other configurations are possible without departing from the scope of the present invention. The system includes a headend, or Host Digital Terminal (HDT) 300, which acts as an interface between a Local Digital Switch (LDS) 200 and multiple Passive Distribution Networks (PDN's) 500. In the preferred embodiment, HDT 300 receives and transmits signals to LDS 200 using the well-known transmission format described in Bellcore document TR-TSY-000008, known as the TR-8 transmission format. The primary signal carried over this format is a DS1 signal, and the transmission system is the T1 digital transmission system. A DS1 signal consists of 24 groups of multiplexed eight-bit samples (DS0's) and one framing bit. Each eight-bit sample or DS0 represents an individual channel (a telephone conversation, for example). It shall be understood, however, that the performance monitoring scheme of the present invention could also be used in systems utilizing other interface formats such as OC-X, STS-X, etc., or a multitude of other transmission formats, without departing from the scope of the present invention.

Each HDT 300 includes termination points for the DS1 lines coming into the FDT 300, circuitry for converting from TR-8 format to PDN format, and circuitry which routes the incoming channels to the appropriate remote unit. The routed channels are then multiplexed to form the downstream traffic signals which are sent over PDN's 500 to their respective destinations.

The downstream optical signals are transmitted over PDN's 500, which in the case of a passive optical network consist of a network of optical fiber and passive optical splitters, and which terminate at a series of Remote Units (RU) 600 which are in the preferred optical system embodiment of an Optical Network Units, or ONU's. In the preferred embodiment, which uses optical fiber as the transmission medium, each HDT 200 can interface to up to 128 RU's 600. However it shall be easily understood that any greater or lesser number could be used without departing from the scope of the present invention. Each RU 600 includes terminations for copper and fiber cables, electronics for signal conversion between PDN media (e.g. optical fiber, coaxial cable or other passive transmission media) and subscriber in-house wiring, and electronics for multiplexing, digital-to-analog conversion, signalling and testing. RU's 600 can be physically located at each individual subscriber premise or in a curbside unit which is shared between multiple subscribers (as is shown in FIG. 1), in which case each RU would house the interface to multiple subscriber telephone lines.

Figure 2:
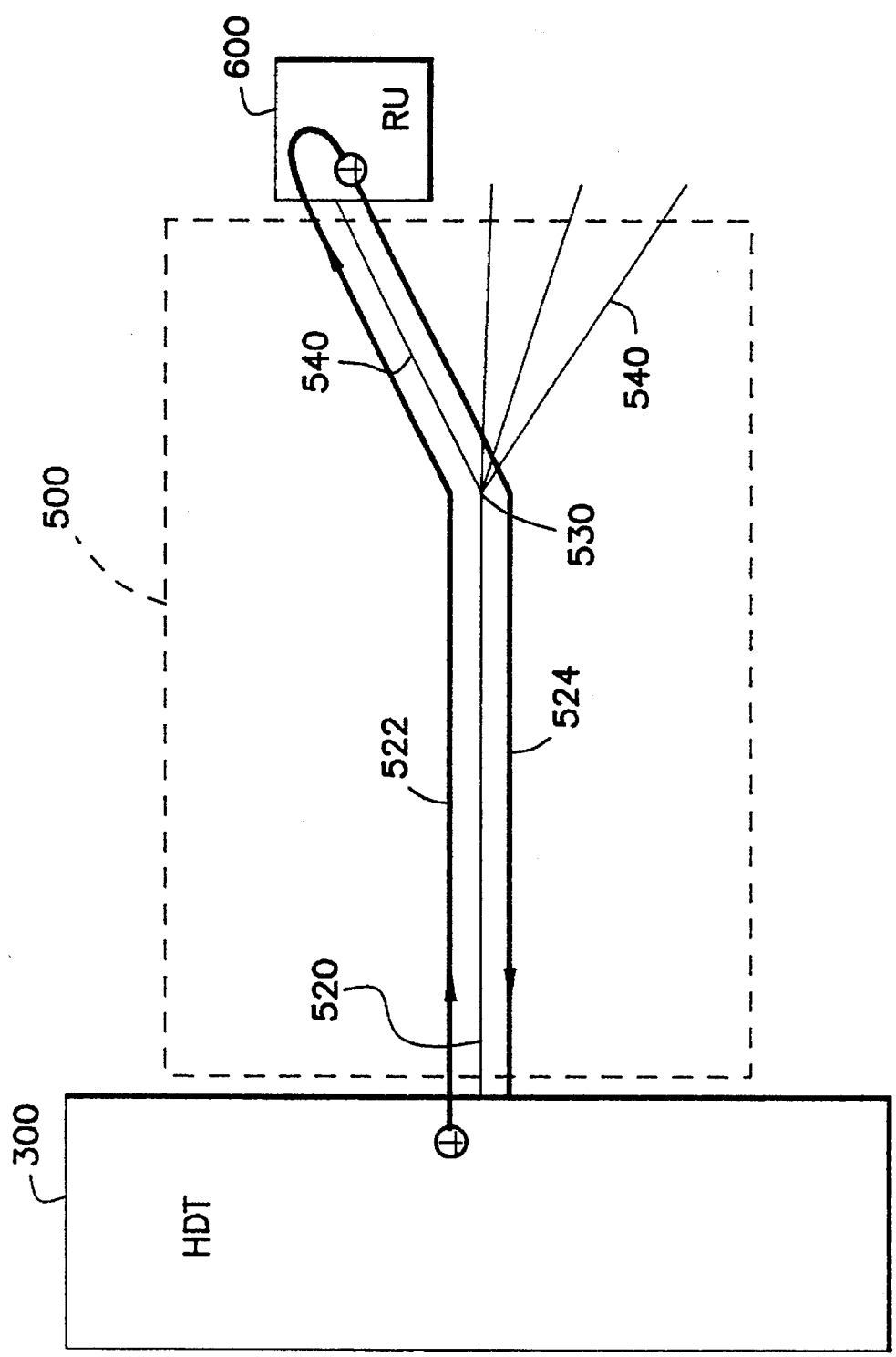
FIG. 2 shows a simplified block diagram of a representative telecommunications system, showing the locations of the feeder and distribution sections of the PDN network.

FIG. 2 shows a simplified view of a representative telecommunications system connected in a point-to-multipoint configuration, including an HDT 300, PDN 500, and multiple RU's 600. Each PDN 500 is comprised of a shared feeder 520 which transmits multiplexed data messages to and from all RU's 600 to HDT 300. Each RU has an associated distribution path 540, or branch of the PDN dedicated to deliver and transit data messages to and from that RU.

Downstream 522 (from HDT 300 to RU's 600) and upstream 524 (from RU's 600 to HDT 300) data messages between HDT 300 and all RU's 600 are multiplexed over the shared feeder 520 section of the PDN 500. The present invention can be used with either Time Division Multiplexing (TDM), Code Division Multiplexing (CDM), or any other appropriate multiplexing scheme. For the sake of illustration the preferred embodiment will be described with respect to TDM. Splitter 530 splits PDN 500 into multiple branches or distribution 540 sections, each associated with a particular RU 600. The RU's are programmed to extract downstream messages and insert upstream messages into the appropriate TDM slot for that RU as is well-known in the art. HDT 300 is programmed to insert data bound for a particular RU into the appropriate downstream time slot. Upstream messages received at HDT 300 from the RU's 600 are identified as to their source by the location of the messages in the TDM frame.

Performance monitoring in a point-to-multipoint system such as that shown in FIGS. 1 and 2 represents a major challenge. Equipment failures in the PDN network can occur which cause errors to be introduced in the downstream and upstream data messages. Each RU in a point-to-multipoint system does not have a dedicated communication link to HDT 300. Instead all RU's have a common path to HDT 300, that is shared feeder 520. This makes it difficult in a point-to-multipoint network configuration to identify the part of the network in which the equipment failure is located. Specifically, it is not readily discernable, from the error code alone whether a particular error or group of errors was introduced by shared feeder 520, one of the dedicated distribution sections 540 of PDN 500 or by one of the RU's themselves.

The present system provides a nonintrusive means to passively monitor the performance of a PDN system and to isolate the location of equipment failures in a PDN system, with minimal impact on the overall performance of the network. To do so, the present system recognizes and makes use of the fact that different equipment failures and the errors they produce manifest themselves in unique error distributions across all RU's over time. For example, a certain type of error distribution reveals that an equipment failure is located in the shared feeder section of the PDN, a different type of error distribution reveals that an equipment failure is located in one of the dedicated distribution sections of the PDN, and a still different type error distribution reveals that a failure lies within one of the RU's themselves.

Figure 3:
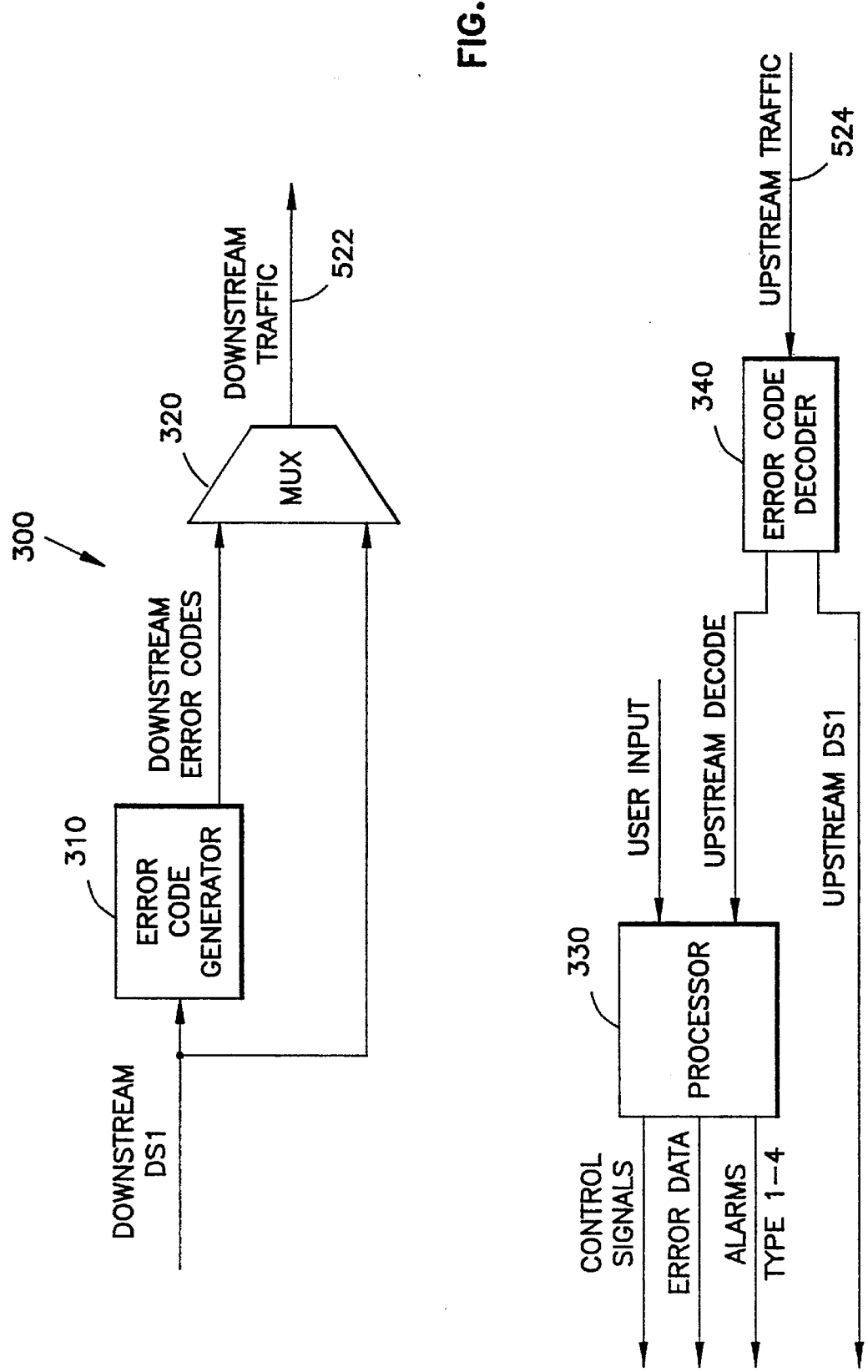
FIG. 3 shows a block diagram of the relevant portions of HDT 300.

Referring now to FIG. 3, the HDT hardware used to generate and analyze the error distributions will now be described. To generate the error distribution, HDT 300 includes an error code generator 310, which generates multiple error codes, one for each RU, which are inserted into the downstream traffic path via multiplexor 320. Each RU has a unique error code associated with it, and extracts and decodes the appropriate error code from the downstream traffic path. Each downstream error code corresponds to a data packet or message sent to an RU in the downstream traffic path and is generated using conventional error code generating techniques. It shall be understood that the present invention is not limited to the use of any particular type of error code, however some example error codes known in the art which can be used with the present invention include parity, Cyclic Redundancy Check (CRC), Single Error Correction Double Error Detection (SECDED) codes, among others.

Figure 4:
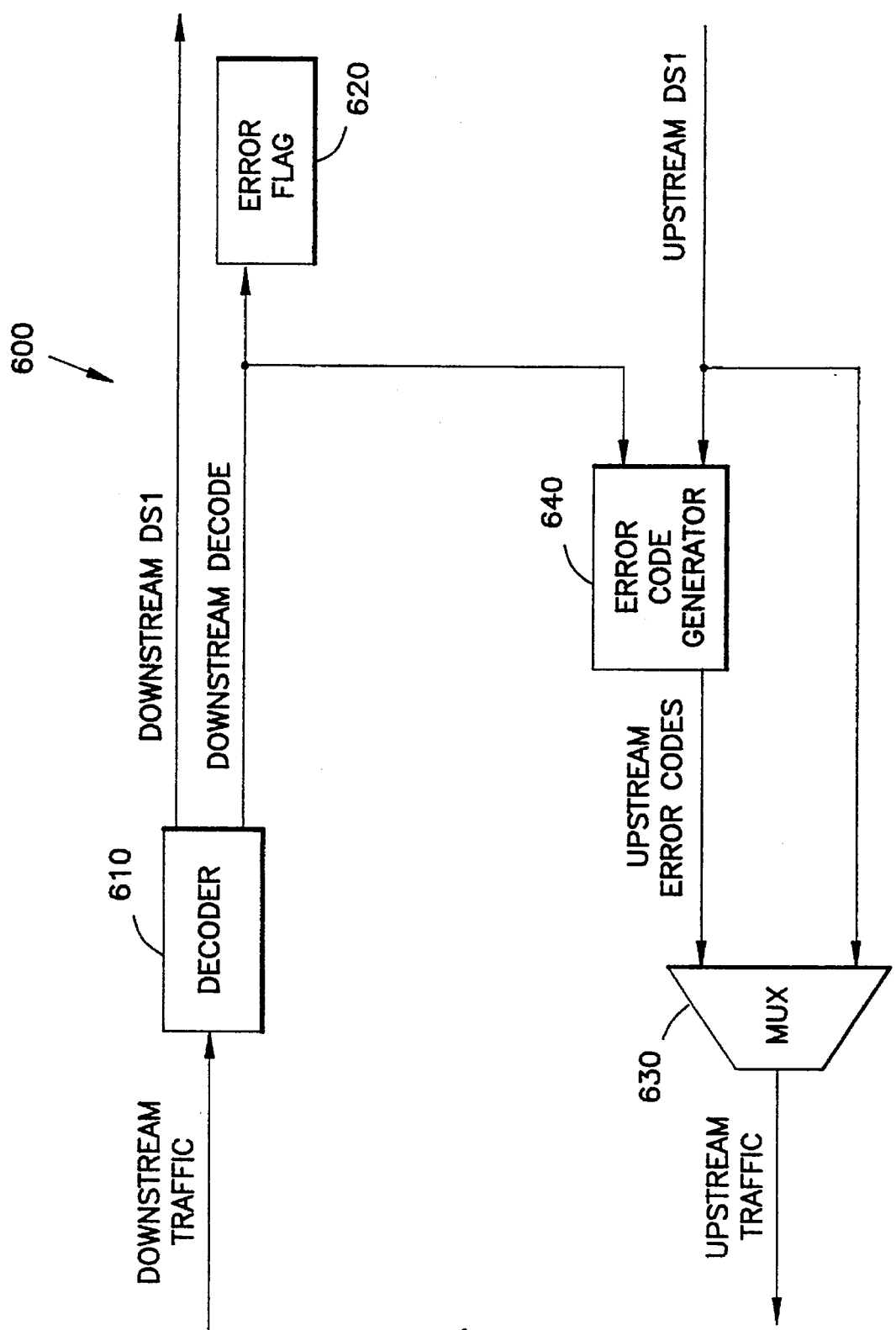
FIG. 4 shows a block diagram of the relevant portions of RU 600.

FIG. 4 shows the relevant hardware of an RU 600. RU 600 receives the downstream traffic and the respective error code is decoded by decoder 610. Error code generator 640 receives the upstream data messages from the subscribers and generates a corresponding upstream error code using any of the known error code techniques. Error code generator 640 also receives the result of the downstream decode and modifies the generated upstream error code to indicate an error if a downstream error was received. Mux 630 inserts the upstream error code into a unique position in the upstream traffic path that is unique to that RU.

Figure 9:
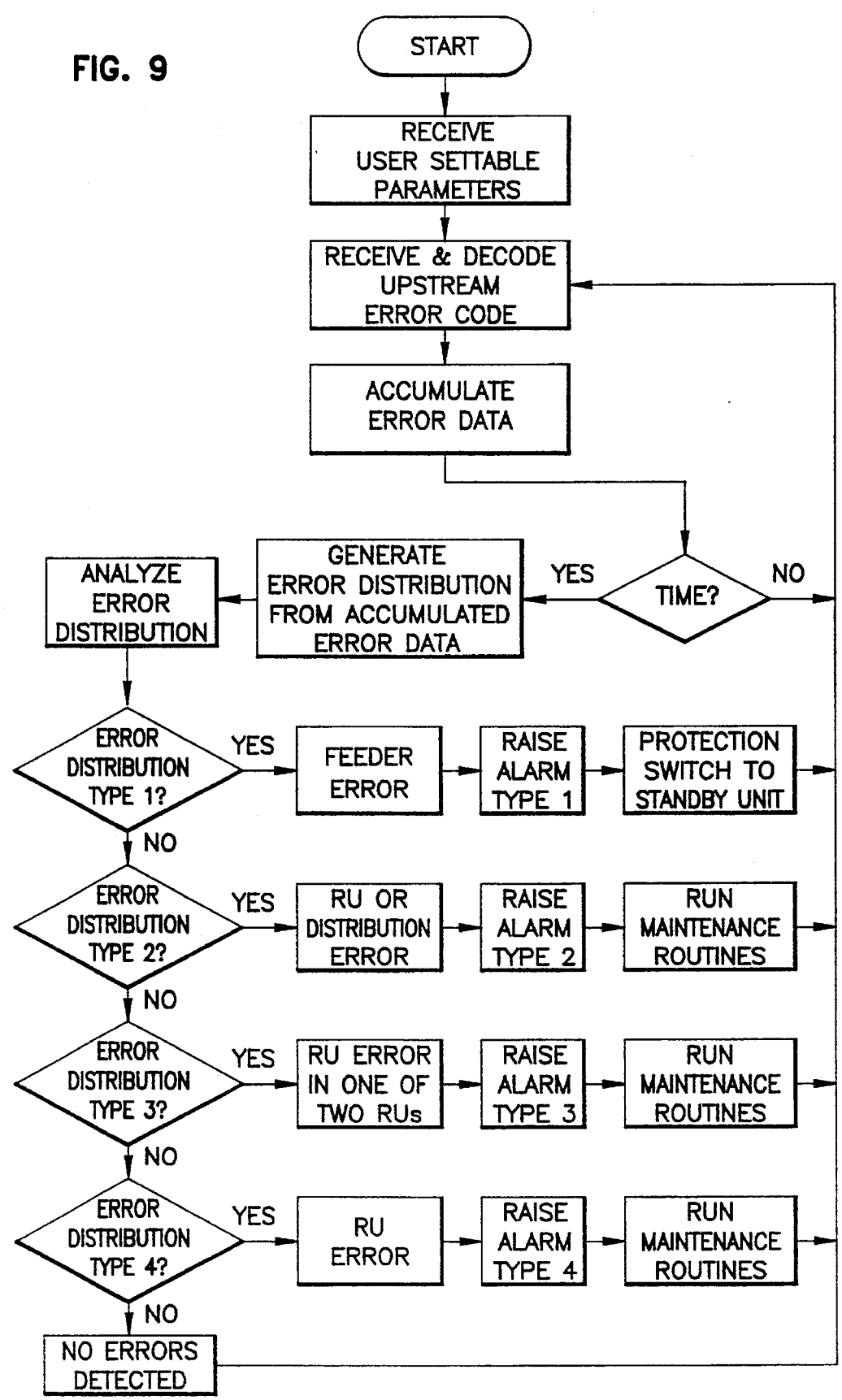
FIG. 9 shows a flow diagram of the error data processing methods used to isolate the location of equipment failures.

Referring again to FIG. 3, the upstream error codes from each of the RU's are received at HDT 300 and the upstream error codes are decoded by decoder 340. HDT 300 includes processor 330 which receives and accumulates the upstream decode information from all the RU's over a specified period of time. Software data processing techniques shown and described below with respect to FIG. 9 are used to generate an error distribution from the accumulated error data. Analysis and interpretation of the resulting error distribution via the software data processing techniques shown in FIG. 9, as discussed below, reveals the number and frequency of errors that occurred, and identifies the relative type, or "shape" of the resulting error distribution. Depending upon the type of error distribution identified, the location of the equipment failure is isolated to either the shared feeder 520 section of PDN 500, one of the distribution 540 sections of PDN 500, or one of the RU's 600.

To isolate the location of equipment failures, the present invention has discovered that four commonly occurring equipment failures in a point-to-multipoint PDN configuration result in four different types, or "shapes" of error distributions as seen across all RU's over time.

The process by which the present system analyzes and isolates the location of equipment failures in a point-to-multipoint configured network will now be described with respect to FIGS. 5–8 and the flow diagram shown in FIG. 9. FIGS. 5–8 show representative error distributions associated with four commonly occurring equipment failures in a point-to-multipoint PDN network. It shall be understood that the example error distributions shown in FIGS. 5–8 are presented herein to show the general shape of the error distributions under certain equipment failure conditions and are not necessarily to scale.

The control software shown in flow diagram form in FIG. 9 runs in processor 330 (shown in FIG. 3). As shown in the flow diagram of FIG. 9, the first processing step in the present system is to receive user settable parameters. In the preferred embodiment of the present invention, certain parameters are settable by the user to achieve the desired degree of accuracy required with a particular network application. For example, the minimum acceptable BER and an alarm triggering BER are both settable by the user for customizing the present system for a particular user or network needs and requirements. Assume for purposes of discussion and not by way of limitation that the minimal acceptable Bit Error Rate, or BER, in the examples of FIGS. 5–8 is set at $10^{-10}$, and that the alarm triggering BER is set at $10^{-3}$.

Referring again to FIG. 9, after the user settable parameters are received and programmed, the upstream error codes are received and decoded. The error data is accumulated over a predetermined period of time. After this time period is complete, an error distribution across all RU's is generated from the accumulated error data in accordance with conventional data processing techniques. Next, the resulting error distribution is analyzed to identify the type or "shape" of the error distribution. The type of error distribution identified indicates an isolated portion of the PDN network where a particular equipment failure is located. Four types of error distributions which commonly occur in a point-to-multipoint network and the associated equipment failures indicated and isolated thereby will now be discussed.

Figure 5:
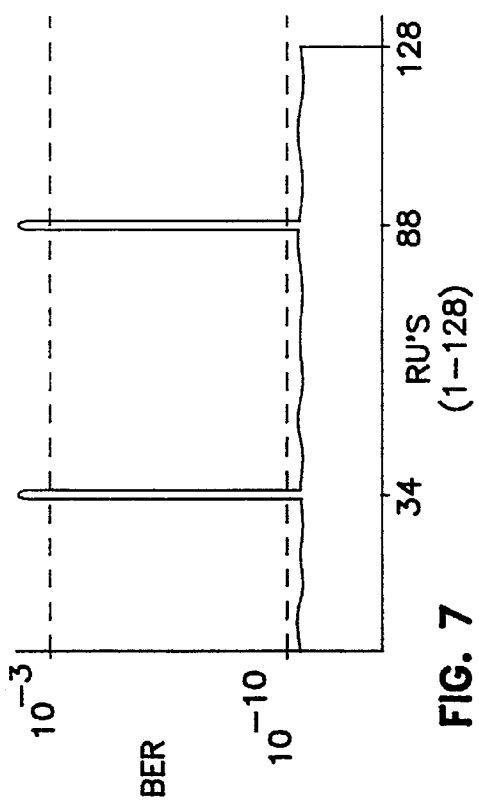
FIG. 5 shows a first type of error distribution which can occur in a point-to-multipoint system configuration.

FIG. 5 shows a first type of error distribution. It shows an example of an even distribution of errors reported across all RU's. Notice that the BER is greater than $10^{-10}$, the minimal number of acceptable errors in this example. This error distribution reveals that shared feeder 520 section of PDN 500 is the source of the errors. This is because feeder 520 is common for all RU's 600 associated with that shared PDN. Therefore, an equipment failure in shared feeder 520 will cause errors to be randomly distributed across all RU's. Thus, the resulting distribution, such as that shown in FIG. 5, shows an evenly distributed unacceptably high level of errors across all RU's.

The error handling procedure which occurs upon identifying this first type of error distribution and isolating the equipment failure shown in FIG. 5 is shown in FIG. 9. Preferably shared feeder 520 is equipment protected with a standby unit, and the recognition of the equipment failure as determined by the present performance monitoring and failure isolation system can be used to cause a protection switch to the standby unit, thus minimizing network downtime. A type 1 alarm is raised by processor 330 to alert maintenance personnel that a type 1 equipment failure was detected and that a protection switch occurred so that the failed equipment can be appropriately repaired or replaced.

Figure 6:
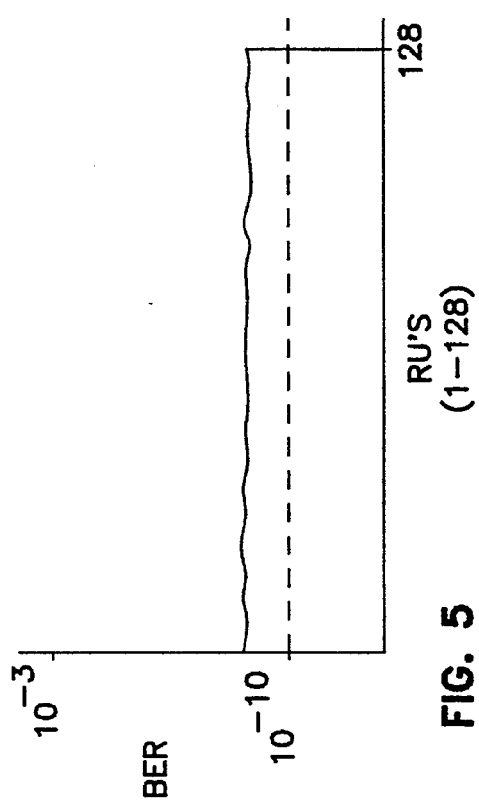
FIG. 6 shows a second type of error distribution.
Figure 7:
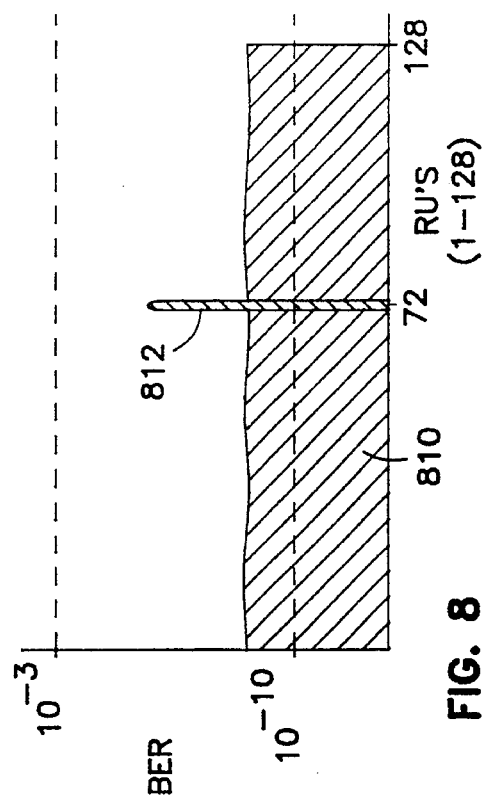
FIG. 7 shows a third type of error distribution.

FIG. 6 shows a second type of error distribution having an acceptable BER (e.g., less than $10^{-10}$ in this example) for all RU's except one (RU number 56 in this example), which has an unacceptably high BER of almost $10^{-3}$. This error distribution reveals that some equipment associated with that RU, i.e., either the RU itself or the associated dedicated distribution path 540, is the location of the equipment failure. Because each distribution path 540 is dedicated to a single RU, equipment failures in a distribution section of PDN 500 cause errors to occur only in data messages traveling to or from that particular RU. Thus, the resulting error distribution such as that shown in FIG. 6 shows an acceptable rate of errors for all RU's with an error peak at the particular RU with which the failure is associated. The error handling procedure for a type 2 error distribution is shown in FIG. 9. An alarm is raised by processor 330 to notify maintenance personnel of the type 2 error found and identifying the suspect RU. In addition appropriate interactive maintenance routines known in the art are run by maintenance personnel to determine whether the equipment failure is located in the RU itself or in the dedicated distribution path.

For certain types of RU equipment failures, a failed RU erroneously reads from or writes into a TDM time slot assigned to a different RU. Such an equipment failure results in a dually peaked error distribution such as that shown in FIG. 7. One of the BER peaks represents the failed RU and the other BER peak represents the overwritten RU. This dually peaked error distribution indicates that an equipment failure is located in one of the RU's having a BER peak. The two peaks must be of the same magnitude to ensure that the problem is appropriately identified. If the problem is that an RU is reading or writing into another RU's time slot, the resulting errors apparent in the two RU's error distributions will be of the same magnitude. This magnitude is in the preferred embodiment settable by the user and is shown as $10^{-3}$ in the example of FIG. 7. When this type 3 error distribution occurs, the error handling procedure shown in FIG. 9 raises an alarm to alert maintenance personnel of the type 3 error occurred. Appropriate interactive maintenance routines known in the art can be run by maintenance personnel between HDT 300 and the suspect RU's can be run to determine which of the suspect RU's contains the error causing equipment failure.

Figure 8:
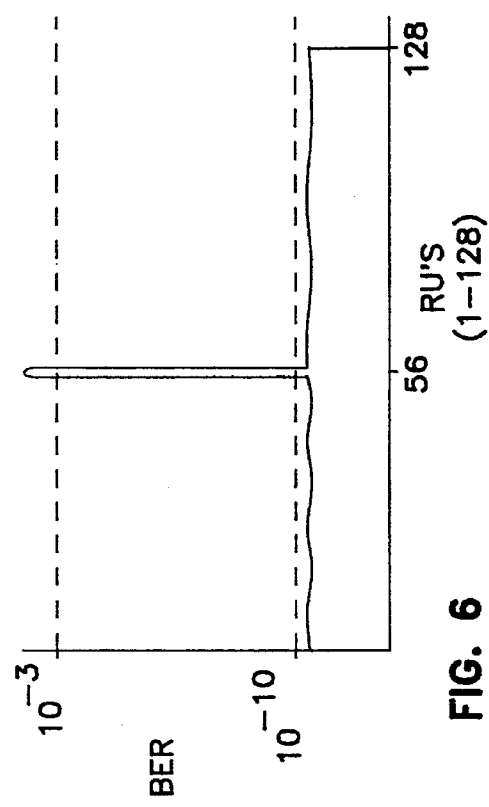
FIG. 8 shows a fourth type of error distribution.

A fourth type of equipment failure results in an RU randomly reading to or writing from the TDM time slots of all the other RU's. FIG. 8 shows a typical error distribution for this fourth type of equipment failure. FIG. 8 reveals an unacceptably heavy BER across all RU's, with a BER error peak at one particular RU (72 in this example). If the errors represented by the error peak reach a certain level, then this error distribution reveals that the peaking RU itself contains an equipment failure. In FIG. 8, for example, the number of errors occurring over all RU's represented by the error curve must be of the same magnitude as the number of errors represented by the error peak at RU 72. In other words, the total errors represented by shaded area 810 should be of the same magnitude as the total number of errors represented by shaded area 812. Checking the magnitude of these errors ensures that the correct problem is identified. If the magnitudes are comparable then the problem can be properly identified as one RU (72 in the example of FIG. 8) randomly writing or reading to the time slots of other RU's. If the magnitudes are not comparable, then the error distribution shown in FIG. 8 may simply be a variation of the distribution shown in FIG. 5. For the fourth type of equipment failure identified by the error distribution of FIG. 8, an alarm is raised to alert maintenance personnel of the type of failure of which occurred and to identify the suspect RU so that appropriate interactive maintenance routing known in the art between the RU and the head end can be performed, as shown in FIG. 9.

The above described performance monitoring and failure isolation system enjoys several advantages over existing methods. For example, the present method raises an immediate alarm condition to report errors. The present invention also passively and unobtrusively monitors the signal integrity across the PDN with only minimal impact on overall network performance. This is opposed to existing schemes which down the entire PDN network and initiate interactive polling of all RU's to determine the location of the problem, resulting in extreme and undesirable reductions in network performance.

The information obtained by the performance monitoring and failure isolation system of the present invention is very useful for protection switching. For example, if the error distribution reveals that the error source is located in shared feeder section 520, that information can be used to initiate a switch to a standby shared feeder unit as described above.

In most PDN systems, the downstream and upstream passive distribution media are switched together as pairs. Thus for most applications the present invention need only locate which section, either shared feeder or distribution, contains the equipment failure and not whether the error source is in the downstream or upstream data traffic path.

Figure 10:
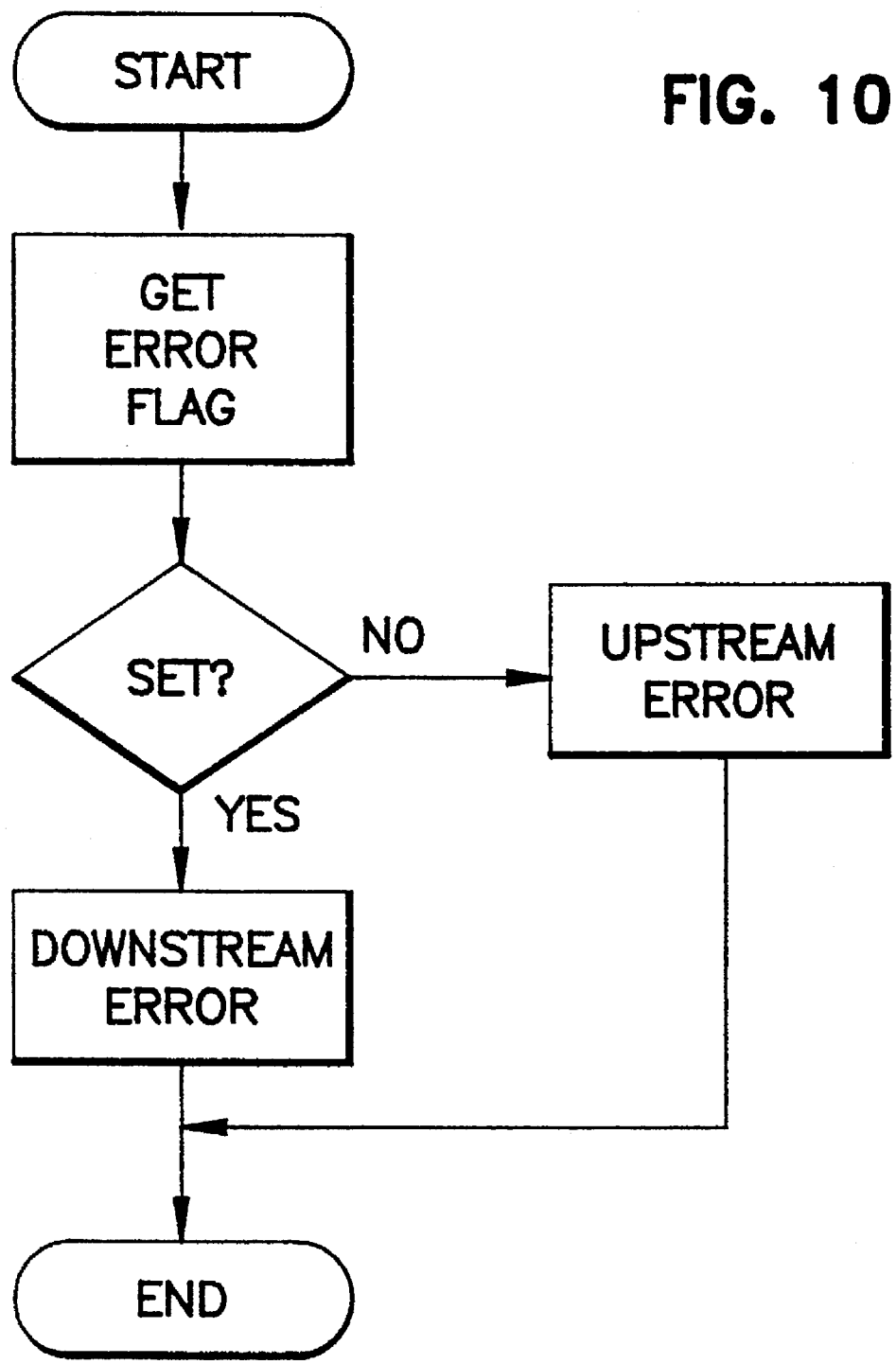
FIG. 10 shows a flow diagram of the polling scheme used to determine whether an error was caused by a failure in the upstream or downstream data traffic path.

However, the present invention does provide a means for determining whether the error source is in the downstream or upstream data traffic path for those applications such as maintenance and troubleshooting where such information is required. Upon receipt and decode of the downstream error code, each RU sets an internal error flag, shown in FIG. 4, indicating whether a downstream error was received. Later, if HDT 300 receives error indication from the RU, HDT 300 can interactively poll the respective RU according to the flow diagram shown in FIG. 10 to determine whether a downstream error occurred. The HDT 300 polls the RU to get the value of the RU internal error flag. If the flag is set, the error occurs in the downstream traffic path. If the error flag is not set, no downstream error occurred, meaning that the error was introduced in the upstream traffic path. Maintenance procedures appropriate to the given problem can be performed by maintenance personnel.

It shall be understood that the present performance monitoring and failure isolation system is not dependent on any particular type of error detection code used. The type of error detection selected will typically depend on the network's available bandwidth. For example, the typical network has little additional bandwidth available for insertion of error detection codes. In that case, a parity error detection scheme, i.e., a single bit error detection code, is advantageous. It is conceivable, however, that some PDN networks have more bandwidth available. In such a case, a more complex error detection/correction scheme requiring more bits, such as Single Error Correction Double Error Detection (SECDED), Cyclic Redundancy Check (CRC), or other more complex error codes could be used.

Moreover, the type of error detection mechanism implemented does not change the fundamental nature of the point-to-multipoint performance monitoring and failure isolation system of the present invention. The use of either simple error schemes such as parity type codes and the use of more complex error detection/correction codes are anticipated in and are within the scope of the present invention.

The specific type of error distribution analysis or data processing methods used on the received error codes is also not a limiting factor in the present invention. Although the preferred embodiment uses, among other methods, an analysis of looking for a predetermined threshold of the proportion of total errors to the proportion of errors associated with a particular RU, many different types of analysis on the error data could be performed to arrive at the same result without departing from the spirit and scope of the present invention.

It shall also be understood that various aspects of the performance monitoring and failure isolation system of the present invention may be used individually if desired to achieve differing levels of functionality in a particular system. For example, if it is not necessary to differentiate downstream or upstream equipment failures, the system could be assembled without the RU error flag. Also, generation, decode and analysis of the upstream error codes alone could be used to achieve reduced levels of performance monitoring and failure isolation.

Although a specific embodiment has been illustrated and described for the preferred embodiment of the present invention set forth herein, it will be readily apparent to those of skill in the art that many modifications and alterations to the preferred embodiment as described herein are possible without deviating from the scope and spirit of the present invention. Special conditions employed for the implementation of the preferred embodiment are not intended to be limiting and are easily adaptable to alternate implementations. For example, the control structure of the present invention could be implemented using microprocessor based architectures and logic functions, including the use of external computer control, RAM microcode control, PLA or PAL logic structures and hardwired or software controlled state machines. Furthermore, the present invention is in no way limited to a certain analytical method used to arrive at and interpret the error distribution across the PDN. Thus, it will be understood that many modifications will be readily apparent to those of ordinary skill in the art, and that this application is intended to cover any adaptations or variations thereof. Therefore, it is manifestly intended that this invention be limited only by the claims and the equivalents thereof.

What is claimed is:

1. A system for performance monitoring a network and isolating the location of equipment failures therein, the network including a head end and a plurality of remote units connected with a distribution means for transmitting data messages between the head end and the plurality of remote ends, said distribution means including a shared feeder connected to the head end, and a plurality of distribution branches, each connected to the shared feeder and to a different one of the plurality of remote units, said system comprising:

first generating means in the head end for generating a plurality of first error codes based on a plurality of downstream data messages;

first transmitting means in the head end for transmitting the plurality of first error codes and the plurality of downstream data messages to the plurality of remote units a plurality of first decoding means, each in a different one of the plurality of remote units, each for decoding one of the plurality of first error codes and determining therefrom whether a downstream error occurred;

a plurality of second generating means, each in a different one of the plurality of remote units, each for generating one of a plurality of second error codes as a function of an upstream data message and whether a downstream error in transmission to the different one of the plurality of remote units occurred;

a plurality of transmitters, each in a different one of the plurality of remote units, for transmitting the one of the plurality of second error codes and the upstream data message to the head end;

decoding means in the head end for decoding the plurality of second error codes received from the plurality of remote units and producing therefrom a plurality of error data;

processing means in the head end for producing an error distribution from the plurality of error data; and means for analyzing the error distribution to isolate the location of equipment failures, said means for analyzing including means for identifying when the error distribution takes the form of an unacceptably high level of errors for two of the plurality of remote units and an acceptable level of errors for the remaining plurality of remote units, wherein the means for analyzing further includes means for isolating the equipment failure to the two remote units having the unacceptably high level of errors.

2. The system of claim 1 wherein the means for analyzing further includes means for identifying when the magnitudes of the unacceptably high level of errors for the two of the plurality of remote units are equivalent.

3. A system for performance monitoring a network and isolating the location of equipment failures therein, the network including a head end and a plurality of remote units connected with a distribution means for transmitting data messages between the head end and the plurality of remote ends, said distribution means including a shared feeder connected to the head end, and a plurality of distribution branches, each connected to the shared feeder and to a different one of the plurality of remote units, said system comprising:

first generating means in the head end for generating a plurality of first error codes based on a plurality of downstream data messages;

first transmitting means in the head end for transmitting the plurality of first error codes and the plurality of downstream data messages to the plurality of remote units a plurality of first decoding means, each in a different one of the plurality of remote units, each for decoding one of the plurality of first error codes and determining therefrom whether a downstream error occurred;

a plurality of second generating means, each in a different one of the plurality of remote units, each for generating one of a plurality of second error codes as a function of an upstream data message and whether a downstream error in transmission to the different one of the plurality of remote units occurred;

a plurality of transmitters, each in a different one of the plurality of remote units, for transmitting the one of the plurality of second error codes and the upstream data message to the head end;

decoding means in the head end for decoding the plurality of second error codes received from the plurality of remote units and producing therefrom a plurality of error data;

processing means in the head end for producing an error distribution from the plurality of error data; and means for analyzing the error distribution to isolate the location of equipment failures, wherein the means for analyzing includes means for identifying when the error distribution takes the form of a first unacceptably high level of errors for one of the plurality of remote units and a second unacceptably high level of errors for the remaining plurality of remote units, the second unacceptably high level of errors being less than the first unacceptably high level of errors.

4. The system of claim 3 wherein the means for analyzing further includes means for isolating the equipment failure to the remote unit having the first unacceptably high level of errors.

5. The system of claim 4 wherein the means for analyzing further includes means for identifying when the first unacceptably high level of errors is of the same magnitude as a total number of errors occurring in across all the remaining plurality of remote units.

6. A system for isolating the location of equipment failures in a telecommunications system including a head end, a plurality of remote ends and a distribution means for transmitting messages between the head end and the plurality of remote units, the distribution means including a shared feeder section connected to the head end and a plurality of distribution sections each connected to the shared feeder and to a different one of the plurality of remote units, the system comprising:

means in the head end for generating a plurality of downstream error codes, each based on a different one of a plurality of downstream messages;

means in each of the remote units for receiving a different one of the plurality of downstream messages and the respective one of the plurality of downstream error codes;

means in each of the remote units for decoding the received downstream error code and determining therefrom whether a downstream error occurred;

error flag means in each of the remote units for indicating whether a downstream error occurred;

means in each of the remote units for generating one of a plurality of upstream error codes each based on one of a plurality of upstream messages and on the decoded downstream error code;

means in the head end for receiving the plurality of upstream messages and the plurality of upstream error codes;

means in the head end for decoding the plurality of upstream error codes, determining therefrom whether at least one of either a downstream or upstream error occurred, and producing therefrom error data representative of at least one of either a downstream or upstream error in transmissions to and from each of the plurality of remote units;

accumulating means for accumulating the error data over a selected period of time and producing therefrom accumulated error data;

means for producing an error distribution across the plurality of remote ends from the accumulated error data;

means for analyzing the error distribution and identifying therefrom a type of the error distribution indicative of the location of an equipment failure;

means for setting a maximum acceptable bit error rate, including means for identifying when the error distribution shows a first level of errors associated with one of the plurality of remote units that is higher than the alarm triggering bit error rate and a uniform level of errors across the remaining plurality of remote units at a second level that is lower than the maximum acceptable bit error rate; and means for setting an alarm triggering bit error rate.

7. The system according to claim 6 wherein the means for analyzing further includes means for identifying when the equipment failure to the one of the plurality of remote units having the first level of errors or to the distribution section connected thereto.

8. A system for isolating the location of equipment failures in a telecommunications system including a head end, a plurality of remote ends and a distribution means for transmitting messages between the head end and the plurality of remote units, the distribution means including a shared feeder section connected to the head end and a plurality of distribution sections each connected to the shared feeder and to a different one of the plurality of remote units, the system comprising:

means in the head end for generating a plurality of downstream error codes, each based on a different one of a plurality of downstream messages;

means in each of the remote units for receiving a different one of the plurality of downstream messages and the respective one of the plurality of downstream error codes;

means in each of the remote units for decoding the received downstream error code and determining therefrom whether a downstream error occurred;

error flag means in each of the remote units for indicating whether a downstream error occurred;

means in each of the remote units for generating one of a plurality of upstream error codes each based on one of a plurality of upstream messages and on the decoded downstream error code;

means in the head end for receiving the plurality of upstream messages and the plurality of upstream error codes;

means in the head end for decoding the plurality of upstream error codes, determining therefrom whether at least one of either a downstream or upstream error occurred, and producing therefrom error data representative of at least one of either a downstream or upstream error in transmissions to and from each of the plurality of remote units;

accumulating means for accumulating the error data over a selected period of time and producing therefrom accumulated error data;

means for producing an error distribution across the plurality of remote ends from the accumulated error data;

means for analyzing the error distribution and identifying therefrom a type of the error distribution indicative of the location of an equipment failure; including means for identifying when the error distribution shows a first level of errors associated with two of the plurality of remote units that is higher than the alarm triggering bit error rate and a uniform level of errors across the remaining plurality of remote units at a second level that is lower than the maximum acceptable bit error rate; and means for setting a maximum acceptable bit error rate.

9. The system according to claim 8 wherein the means for analyzing further includes means for identifying when the equipment failure to the two of the plurality of remote units having the first level of errors or to the distribution sections connected thereto.

10. A system for isolating the location of equipment failures in a telecommunications system including a head end, a plurality of remote ends and a distribution means for transmitting messages between the head end and the plurality of remote units, the distribution means including a shared feeder section connected to the head end and a plurality of distribution sections each connected to the shared feeder and to a different one of the plurality of remote units, the system comprising:

means in the head end for generating a plurality of downstream error codes, each based on a different one of a plurality of downstream messages;

means in each of the remote units for receiving a different one of the plurality of downstream messages and the respective one of the plurality of downstream error codes;

means in each of the remote units for decoding the received downstream error code and determining therefrom whether a downstream error occurred;

error flag means in each of the remote units for indicating whether a downstream error occurred;

means in each of the remote units for generating one of a plurality of upstream error codes each based on one of a plurality of upstream messages and on the decoded downstream error code;

means in the head end for receiving the plurality of upstream messages and the plurality of upstream error codes;

means in the head end for decoding the plurality of upstream error codes, determining therefrom whether at least one of either a downstream or upstream error occurred, and producing therefrom error data representative of at least one of either a downstream or upstream error in transmissions to and from each of the plurality of remote units;

accumulating means for accumulating the error data over a selected period of time and producing therefrom accumulated error data;

means for producing an error distribution across the plurality of remote ends from the accumulated error data;

means for analyzing the error distribution and identifying therefrom a type of the error distribution indicative of the location of an equipment failure, including means for identifying when the error distribution rate shows a first level of errors associated with one of the plurality of remote units that is higher than the maximum acceptable bit error rate and a uniform level of errors across the remaining plurality of remote units at a second level that is higher than the maximum acceptable bit error rate and lower than the first level of errors; and means for setting a maximum acceptable bit error rate.

11. The system according to claim 10 wherein the means for analyzing further includes means for isolating the equipment failure to the one of the plurality of remote units having the first level of errors or to the distribution section connected thereto.

12. A method of analyzing an error distribution to isolate the location of equipment failures in a communications system, the communications system including a distribution network including a shared feeder connected to a head end and a plurality of distribution sections, each connected to the shared feeder and to a different one of a plurality of remote units, the method comprising the step of:

(a) setting a maximum acceptable bit error rate;

(b) setting an alarm triggering bit error rate, wherein the alarm triggering bit error rate is higher than the maximum acceptable bit error rate;

(c) accumulating a plurality of error codes representative of at least one of either a downstream or upstream error in transmissions to and from each of the plurality of remote units and generating therefrom a set of error data;

(d) generating an error distribution from the set of error data received from the plurality of remote units;

(e) comparing the error distribution with the maximum acceptable bit error rate and the alarm triggering bit error rate; and (f) isolating an equipment failure based on the outcome of comparing step (e), including isolating a second equipment failure if the result of comparison step (e) shows a level of errors that is higher than the alarm triggering bit error rate for one of the plurality of remote units and an even distribution of errors across the remaining plurality of remote units at a level that is lower than the maximum acceptable bit error rate.

13. The method according to claim 12 wherein isolating step (f) further includes the step of isolating the equipment failure to the one of the plurality of remote units.

14. The method according to claim 12 wherein isolating step (f) further includes the step of isolating the equipment failure to two of the plurality of remote units.

15. A method of analyzing an error distribution to isolate the location of equipment failures in a communications system, the communications system including a distribution network including a shared feeder connected to a head end and a plurality of distribution sections, each connected to the shared feeder and to a different one of a plurality of remote units, the method comprising the step of:

(a) setting a maximum acceptable bit error rate;

(b) setting an alarm triggering bit error rate, wherein the alarm triggering bit error rate is higher than the maximum acceptable bit error rate;

(c) accumulating a plurality of error codes representative of at least one of either a downstream or upstream error in transmissions to and from each of the plurality of remote units and generating therefrom a set of error data;

(d) generating an error distribution from the set of error data received from the plurality of remote units;

(e) comparing the error distribution with the maximum acceptable bit error rate and the alarm triggering bit error rate; and (f) isolating an equipment failure based on the outcome of comparing step (e) wherein the plurality of remote units includes at least three remote units and including the step of isolating a third equipment failure if the result of comparison step (e) shows a level of errors that is higher than the alarm triggering bit error rate for two of the plurality of remote units and an ever distribution of errors across the remaining plurality of remote units at a level that is lower than the maximum acceptable bit error rate.

16. A method of analyzing an error distribution to isolate the location of equipment failures in a communications system, the communications system including a distribution network including a shared feeder connected to a head end and a plurality of distribution sections, each connected to the shared feeder and to a different one of a plurality of remote units, the method comprising the step of:

(a) setting a maximum acceptable bit error rate;

(b) setting an alarm triggering bit error rate, wherein the alarm triggering bit error rate is higher than the maximum acceptable bit error rate;

(c) accumulating a plurality of error codes representative of at least one of either a downstream or upstream error in transmissions to and from each of the plurality of remote units and generating therefrom a set of error data;

(d) generating an error distribution from the set of error data received from the plurality of remote units;

(e) comparing the error distribution with the maximum acceptable bit error rate and the alarm triggering bit error rate; and (f) isolating an equipment failure based on the outcome of comparing step (e), including isolating a fourth equipment failure if the result of comparison step (e) shows a first rate of errors for one of the plurality of remote units that is higher than the maximum acceptable bit error rate and an even distribution of errors across the remaining plurality of remote units at a second rate of errors that is higher than the maximum acceptable bit error rate, wherein the second rate of errors is lower than the first rate of errors.

17. The method according to claim 16 wherein isolating step (f) further includes the step of isolating the equipment failure to the one of the plurality of remote units.

18. A method for monitoring the performance of a telecommunications system connected in a point-to-multipoint configuration, and for isolating the location of equipment failures therein, the telecommunications system including a distribution system including a shared feeder section connected to a head end and a plurality of distribution sections each connected to the shared feeder section and to a different one of the plurality of remote units, the method comprising the steps of:

(a) generating a plurality of first error codes based on a plurality at the head end of downstream messages;

(b) transmitting each of the plurality of error codes to a different one of a plurality of remote units over the distribution network;

(c) decoding at each remote unit each of the error codes and downstream messages to determine whether any downstream errors occurred;

(d) generating at each remote unit a plurality of second error codes based on the decoded downstream error codes and on a plurality of upstream messages, wherein each of the plurality of second error codes is generated in a different one of the remote units;

(e) transmitting the plurality of second error codes and corresponding upstream messages to the head end over the distribution network;

(f) accumulating the plurality of error codes received from the plurality of remote units over a selected period of time;

(g) generating an error distribution from the accumulated error codes; and (h) analyzing the error distribution and isolating therefrom the location of the equipment failures;

(i) setting a maximum acceptable bit error rate;

(j) setting an alarm triggering bit error rate, wherein the alarm triggering bit error rate is higher than the maximum acceptable bit error rate;

(k) comparing the error distribution with the maximum acceptable bit error rate and the alarm triggering bit error rate;

(l) isolating an equipment failure based on the outcome of comparing step (k), including isolating a second equipment failure if the result of the comparison step (k) shows a rate of errors that is higher than the alarm triggering bit error rate for one of the plurality of remote units and an even distribution of errors across the remaining plurality of remote units at a rate that is lower than the maximum acceptable bit error rate.

19. The method according to claim 18 wherein isolating step (l) further includes the step of isolating the equipment failure to the one of the plurality of remote units.

20. A method for monitoring the performance of a telecommunications system connected in a point-to-multipoint configuration, and for isolating the location of equipment failures therein, the telecommunications system including a distribution system including a shared feeder section connected to a head end and a plurality of distribution sections each connected to the shared feeder section and to a different one of the plurality of remote units, the method comprising the steps of:

(a) generating a plurality of first error codes based on a plurality at the head end of downstream messages;

(b) transmitting each of the plurality of error codes to a different one of a plurality of remote units over the distribution network;

(c) decoding at each remote unit each of the error codes and downstream messages to determine whether any downstream errors occurred;

(d) generating at each remote unit a plurality of second error codes based on the decoded downstream error codes and on a plurality of upstream messages, wherein each of the plurality of second error codes is generated in a different one of the remote units;

(e) transmitting the plurality of second error codes and corresponding upstream messages to the head end over the distribution network;

(f) accumulating the plurality of error codes received from the plurality of remote units over a selected period of time;

(g) generating an error distribution from the accumulated error codes; and (h) analyzing the error distribution and isolating therefrom the location of the equipment failures;

(i) setting a maximum acceptable bit error rate;

(j) setting an alarm triggering bit error rate, wherein the alarm triggering bit error rate is higher than the maximum acceptable bit error rate;

(k) comparing the error distribution with the maximum acceptable bit error rate and the alarm triggering bit error rate;

(l) isolating an equipment failure based on the outcome of comparing step (k), including isolating a third equipment failure if the result of comparison step (k) shows a rate of errors that is higher than the alarm triggering bit error rate for two of the plurality of remote units and an even distribution of errors across the remaining plurality of remote units at a rate that is lower than the maximum acceptable bit error rate.

21. The method according to claim 20 wherein isolating step (l) further includes the step of isolating the equipment failure to the two of the plurality of remote units.

22. A method for monitoring the performance of a telecommunications system connected in a point-to-multipoint configuration, and for isolating the location of equipment failures therein, the telecommunications system including a distribution system including a shared feeder section connected to a head end and a plurality of distribution sections each connected to the shared feeder section and to a different one of the plurality of remote units, the method comprising the steps of:

(a) generating a plurality of first error codes based on a plurality at the head end of downstream messages;

(b) transmitting each of the plurality of error codes to a different one of a plurality of remote units over the distribution network;

(c) decoding at each remote unit each of the error codes and downstream messages to determine whether any downstream errors occurred;

(d) generating at each remote unit a plurality of second error codes based on the decoded downstream error codes and on a plurality of upstream messages, wherein each of the plurality of second error codes is generated in a different one of the remote units;

(e) transmitting the plurality of second error codes and corresponding upstream messages to the head end over the distribution network;

(f) accumulating the plurality of error codes received from the plurality of remote units over a selected period of time;

(g) generating an error distribution from the accumulated error codes; and (h) analyzing the error distribution and isolating therefrom the location of the equipment failures;

(i) setting a maximum acceptable bit error rate;

(j) setting an alarm triggering bit error rate, wherein the alarm triggering bit error rate is higher than the maximum acceptable bit error rate;

(k) comparing the error distribution with the maximum acceptable bit error rate and the alarm triggering bit error rate;

(l) isolating an equipment failure based on the outcome of comparing step (k), including isolating a fourth equipment failure if the result of the comparison step (k) shows a first rate of errors that is higher than the maximum acceptable bit error rate for one of the plurality of remote units and an even distribution of errors across the remaining plurality of remote units at a second rate of errors that is higher than the maximum acceptable bit error rate, wherein the second rate of errors is lower than the first rate of errors.

23. The method according to claim 22 wherein isolating step (l) further includes the step of isolating the equipment failure to the one of the plurality of remote units.

* * * * *